US 6,892,489 B1

(12) United States Patent
Leuf

(10) Patent No.: US 6,892,489 B1
(45) Date of Patent: May 17, 2005

(54) X TAIL FLEXIBLE FISHING LURES

(76) Inventor: Jack Joseph Leuf, 1513 Lincoln Ave., Corona, CA (US) 92882-3910

( * ) Notice: Subject to any disclaimer, the term of this patent is extended or adjusted under 35 U.S.C. 154(b) by 0 days.

(21) Appl. No.: 10/412,885

(22) Filed: Apr. 14, 2003

Related U.S. Application Data
(60) Provisional application No. 60/396,769, filed on Jul. 18, 2002.

(51) Int. Cl.$^7$ .............................................. A01K 85/00
(52) U.S. Cl. ..................................................... 43/42.24
(58) Field of Search ............................. 43/42.24–42.28

(56) References Cited

U.S. PATENT DOCUMENTS

| | | | |
|---|---|---|---|
| D239,281 S | | 3/1976 | Williams |
| 3,959,912 A | * | 6/1976 | Lee ............................ 43/42.02 |
| 4,619,069 A | * | 10/1986 | Strickland ................... 43/42.26 |
| 4,709,501 A | | 12/1987 | Garst |
| 4,887,377 A | | 12/1989 | Morris |
| 5,009,024 A | * | 4/1991 | Parman ....................... 43/42.3 |
| 5,640,798 A | | 6/1997 | Garst |
| 5,996,271 A | * | 12/1999 | Packer ........................ 43/42.24 |
| 6,363,651 B1 | * | 4/2002 | Garst .......................... 43/42.24 |
| 6,564,499 B1 | * | 5/2003 | Firmin ........................ 43/42.26 |
| 6,634,135 B1 | * | 10/2003 | Rydell ......................... 43/42.1 |
| 6,675,525 B1 | * | 1/2004 | Ford ........................... 43/42.24 |

OTHER PUBLICATIONS

New Tassel Lizard by Culprit, p. 214, Bass Pro Shops Spring 2003 Master Catalog, Springfield, MO.
Hairy Hogg by Yum, p. 208, Bass Pro Shops Spring 2003 Master Catalog, Springfield, MO.
Weedless Triple Ripple Stump Jumper, p. 197 of catalog as above.
Triple Ripple Water Bug Worm, p. 218 of same catalog as above.

* cited by examiner

*Primary Examiner*—Peter M. Poon
*Assistant Examiner*—Bethany L. Griles

(57) ABSTRACT

A completely flexible fishing lure designed to imitate the look and motion of a fish or other living creature when towed through the water on a fishing line. The lure consists of a body made of flexible material with two tails of a general semi-circular or sickle shape, integrally molded to the body and made of the same material. The tails are positioned opposite one another with the inside edge of each tail facing the inside edge of the other at the point of attachment. Each tail may also be positioned to overlap the other. Each tail extends first in a rearward direction and at some point in its length turns inward and crosses the other tail. After crossing the other tail each tail extends outward and forward or extends away from the other tail. The tails are molded thin and generally membrane-like but the thickness is variable depending on the action desired. Both tails are separated during the molding process and in use. A separation plate placed between the two halves of the mold used to produce the lure produces this separation. The semi-circular or arc like tails are basically flat and lie in separate horizontal planes separated by the separation plate during the molding process. The tails can be of the same size or of varying lengths, widths and thickness and can extend the full length of the body if desired. When pulled through the water on a fishing line the tails produce a wide area of wavy and rippling motion in some embodiments and a fast vibrating motion in other embodiments depending on the shape and thickness of the tails. Several new tail designs are also shown in the present specification including improved sickle shaped tails in a saw-tooth-like pattern, reverse sickle shaped tails, and other variations.

14 Claims, 14 Drawing Sheets

30 32

X TAIL FLEXIBLE FISHING LURES

CROSS-REFERENCE TO RELATED APPLICATIONS

This application claims the benefit of Provisional Patent Application No. 60/396,769 filed on Jul. 18, 2002.

FEDERALLY SPONSORED RESEARCH

Not Applicable.

SEQUENCE LISTING OR PROGRAM

Not Applicable.

BACKGROUND OF THE INVENTION

Field of the Invention

The present invention relates to flexible fishing lures used on a fishing line for attracting and catching fish, which resemble a live swimming fish or other creature in shape and motion when towed through the water and a method of making the same.

One of the most successful fishing lures ever invented was the soft plastic worm, which became very popular about thirty years ago and has continued to be as popular or even more popular today. Since that time, inventors and manufacturers have endeavored to build a completely flexible fishing lure, which mimicked the motion and looks of a live fish when pulled through the water on a fishing line. Several methods of producing motion in soft plastic lures have been discovered over the years. One method is placing a deflection plate at the rear end of the lure which produces a side to side oscillating motion of the tail of the lure as the lure is pulled through the water on a fishing line. A deflection plate of this type can be seen in U.S. Pat. No. 3,897,882 of Rask and U.S. Pat. No. 5,193,299 of Correll and Gribble. Another method of producing motion is by adding a tail made of thin flexible material in the basic shape of a sickle. A sickle shaped tail of this type has a tendency to straighten out by the force of water when towed through the water producing a rippling or wavy motion along its longer outer edge. A lure with a tail design of this type can be seen in the drawings in U.S. Pat. No. 4,887,377. Lures of this kind have been around for many years with several variations including lures with dual tails and with split tails to give the lure more action. Sickle shaped tails of this type are basically flat and generally lie on a single horizontal plane during their manufacture, which limits the different designs which can be used with them. Lures with dual sickle shaped tails in one of the most popular versions, generally take on the shape of a Y when they are pulled through the water with two arms of the Y producing a rippling motion. There is a wide gap between the rippling arms of the Y. Lures like these generally have the sickle shaped tails arranged in a heart like pattern. Lures of this type are rarely used to produce a fish-like lure since they don't look much like a fish. In another similar lure the tails are arranged with both tails extending rearward and outward. This design might work to produce a fish like lure but for some reason such a lure wasn't found in a patent search or in a search of manufactured lures. Homemade versions of similar lures had tails that had a tendency to tangle occasionally and not produce any motion. U.S. Pat. No. 6,363,651 shows an improved dual sickle tail lure with tails placed side by side, each lying in a different horizontal plane. This lure also produces somewhat of a side by side Y shaped pattern with a narrow area of motion, which isn't suited very well when trying to represent a fish. The same patent also shows lures shaped like fish with undulating fins. The fins of these lures are molded with the waves or ripples molded into the fins and require that an expensive mold with both concave and convex aspects on each mold plate be made. It was discovered by experimentation that the inside diameter of a sickle shaped tail straightens out and forms almost a straight line when pulled through the water and produces only minor motion. The outside diameter buckles and forms waves which produce undulating motion when pulled through the water. This is due to the fact that the inside diameter of the sickle is shorter than the outside diameter. It was deduced that if two sickle tails were properly aligned inside diameter to inside diameter, the two tails should straighten out and parallel one another, inside diameter to inside diameter when towed through the water. This proved to be the case after experimentation and building molds. The tails didn't tangle even though they extend inwards and cross one another. U.S. Pat. No. 6,363,651 is the closest prior art lure found but didn't describe the present invention. The present invention is different from the Garst patent in that the sickle shaped tails of the lure in the Garst patent according to the claims, extend rearward and outward from a mid body point, both lying on separate parallel planes with a space between each tail. The specification suggests some variation in either a horizontal or vertical direction, but there can be only so much variation before the tails no longer extend rearward and outward from a mid body point. The Garst patent doesn't suggest or anticipate the present invention since the present invention is an important lure with many advantages and if anticipated, should have been claimed. The claims don't suggest or anticipate the present invention since the tails of the present invention extend from an upper and a lower edge or surface of the lure body rearward and inward crossing one another, then extend outward or away from one another. The Garst patent also does not suggest or anticipate a precision alignment of two sickle shaped tails that produces an inside diameter to inside diameter parallel relationship when pulled through the water. The Garst patent may also require a fairly wide space between both sickle shaped tails to get full undulating motion from both tails, since the tails are side by side.

OBJECTS AND ADVANTAGES

The objects and advantages of the present invention are as follows:

1. To produce a fishing lure that resembles a fish in shape and swimming motion.
2. Another object is to produce a fishing lure with a wide area of life-like motion.
3. Another object is to improve the tried and true sickle shaped tail used for many years by fishermen, by arranging two tails inside edge to inside edge to produce lures that represent other creatures such as crayfish, shrimp, worms, frogs and grubs.
4. To produce a fishing lure with a more lifelike, balanced tail, than the prior art.
5. Another object is to make a fishing lure with a different action with tails that don't tangle.
6. Another object is to produce a completely flexible fishing lure with a powerful vibrating action in some embodiments.
7. Another object is to produce a simpler and less expensive lure to manufacture.
8. The advantages are the ability of the lure to attract more fish and from farther distances due to a wider area of motion and visibility. Also a wider area of motion more closely resembles the natural swimming motion and shape of a fish over the narrower motion or the Y lures of the prior art.

9. Another advantage is a lure that attracts fish additionally by strong vibrations caused by the motion of the tails in some embodiments. It has been known for many years that fish are attracted to vibrations in the water.

10. Another advantage is a lure, which uses a simpler mold than the closest prior art.

DESCRIPTION OF DRAWING FIGURES

REFERENCE NUMERALS IN DRAWINGS

2 Lure Body
3 Protruding Eyes
6 Space
7 Gap
8 X-Zone (Tail Intersection Area)
10a Upper or Right Tail
10b Lower or Left Tail
12 Lead Head
13 Lead Head Jig
14 Jig Hook
16 Rear Body Centerline
18 Innermost Sickle Shaped Appendage
19 Innermost Reverse Sickle Shaped Appendage
20a Upper or Right Tail Inner Edge
20b Lower or Left Tail Inner Edge
22a Upper or Right Tail Outer Edge
22b Lower or Left Tail Outer Edge
24a Upper or Right Tail Attached Edge
24b Lower or Left Tail Attached Edge
28 Phantom Outer Edge
30 Separation Plate
32 Cutout
34 Additional Appendages

DESCRIPTION OF THE PREFERRED EMBODIMENTS

FIGS. 1–8 refer to one embodiment or the first embodiment of the fishing lure of the present invention. The fishing lure in this embodiment comprises a body 2 generally resembling the body of a fish with an upper tail or appendage 10a and a lower tail or appendage 10b as shown in drawing FIGS. 1 and 2. The use of the words "tail" and "appendage" should be considered interchangeable and mean basically the same thing throughout this specification; since tail can mean appendage and appendage can refer to a limb or leg.

The word "tail" was used most frequently to make the specification more understandable. The fishing lure is preferably injection molded of flexible material such as vinyl plastisol. The lure body 2 is made of greater thickness than the tails 10*a* and 10*b* to provide a means of attaching a hook. The lure body 2 can be equipped with protruding eyes 4, gills, mouth and even scale-like impressions molded into the lure body 2 if desired. The lure body 2 can be patterned or molded to look almost exactly like a real fish if desired.

Figure 1:
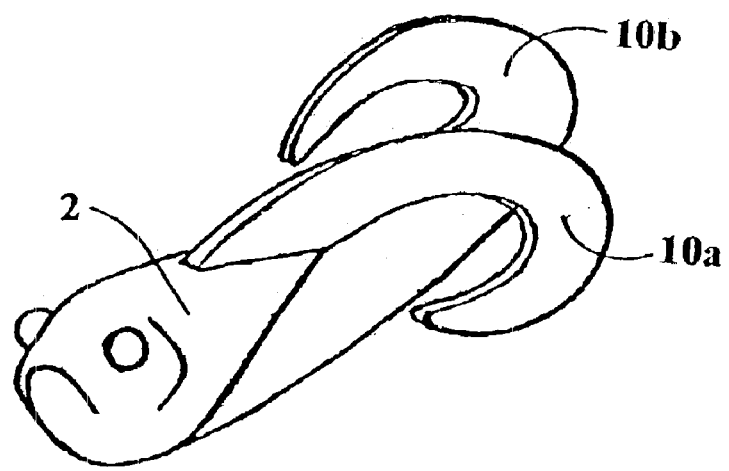
FIG. 1 is a perspective view of one embodiment.
Figure 2:
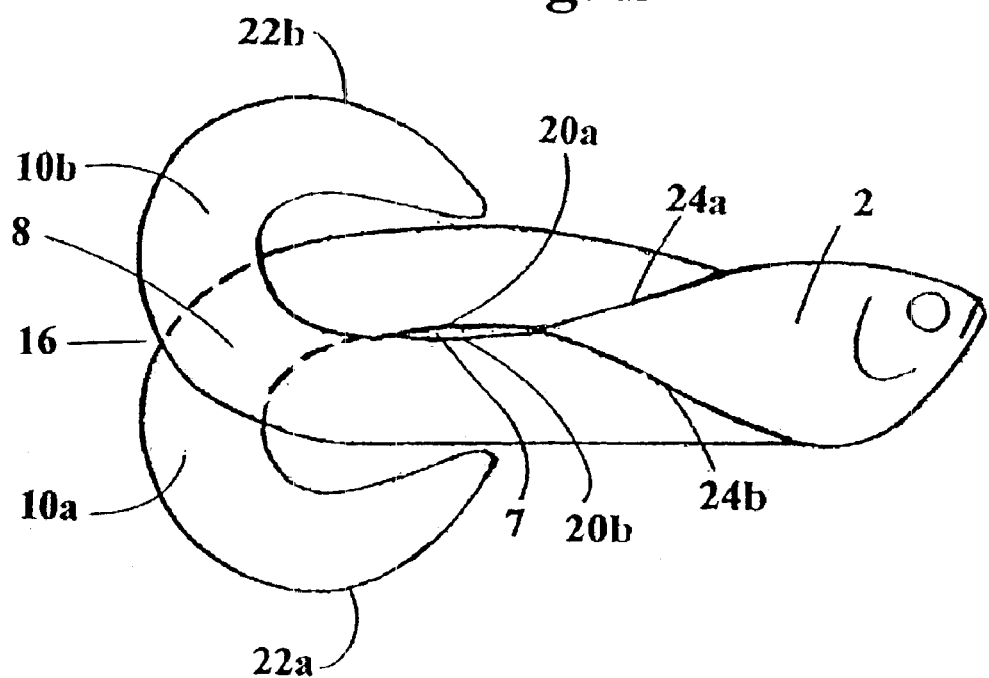
FIG. 2 is a side view of the embodiment of FIG. 1.

The upper tail 10*a* and the lower tail 10*b* are integrally-molded to the lure body 2. The upper tail 10*a* and lower tail 10*b* in the first embodiment are of sickle shape or semi-circular design (arc-like) generally and can be patterned after just about any sickle shaped tail on the market today. The sickle shaped tails on the market today generally taper from their widest width at their attached edges, to a narrower distal end, or taper from the attached edge, to their widest width somewhere along their length, and then taper to their narrowest width at the distal end. The tails in this embodiment have outer edges, inner edges, and attached edges as shown in FIG. 2. The number 22*a* represents the upper tail outer edge, the lower tail outer edge is 22*b*, the upper tail inner edge is 20*a*, the lower tail inner edge is 20*b*, the upper tail attached edge is 24*a*, the lower tail attached edge is 24*b*. The upper tail attached edge 24*a* and the lower tail attached edge 24*b* connect the upper tail 10*a* and the lower tail 10*b* to the upper and lower edge or face, respectively, of the lure body 2.

Figure 3:
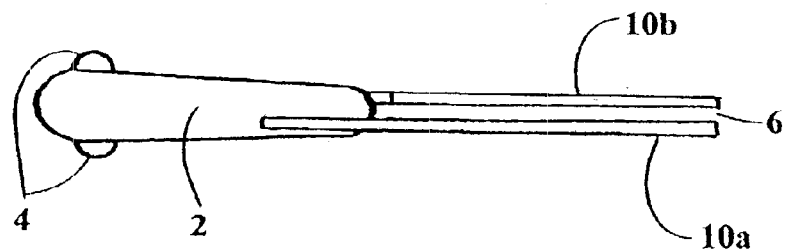
FIG. 3 depicts a top view of the embodiment of FIG. 1.
Figure 4:
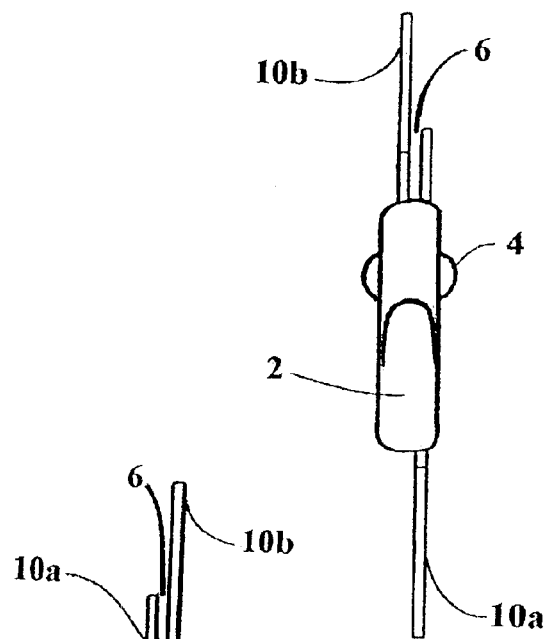
FIG. 4 depicts a front view of the embodiment of FIG. 1.
Figure 5:
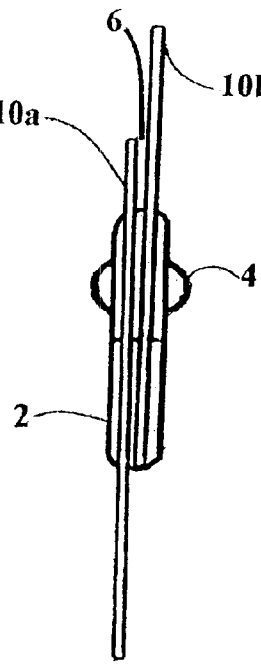
FIG. 5 depicts a back view of the embodiment of FIG. 1.

Each tail (appendage) when molded lies on a separate parallel plane separated by a separation plate 30. Both tails must remain separated from one another during the manufacturing process and in use. Drawing FIGS. 3,4 and 5 show a space 6 between the upper tail 10*a* and the lower tail 10*b*. This space 6 is produced by placing a separation plate 30 between both halves of the mold used to build the lure and is necessary to keep both tails separated during the molding process. The space 6 is the same width as the thickness of the separation plate 30 and this thickness is variable. Separation plates of from approximately ³⁄₁₆ of an inch in thickness down to almost paper thickness were tried with no noticeable difference in lure performance. This space 6 is noticeable when the lure is viewed from the top, bottom, front or rear.

In this and in all similar embodiments of this lure, the tails can be aligned with precision to preferably obtain the smallest gap 7 possible between the two tails, when the lure is towed through the water. When positioned properly both tails will appear to be aligned upper tail ix inner edge 20*a* to lower tail inner-edge 20*b* for a distance before encountering the semi-circular (arc-like) portion of tail. Both tails will also generally appear to align upper tail inner edge 20*a* to lower tail inner edge 20*b*, for the full length of the tail, when towed through the water. As stated above both tails when properly aligned will appear to align inside edge to inside edge even though they aren't actually aligned. The tails only appear to be aligned, since they have a space 6 separating both tails. Both tails are positioned so as to cross one another at an intersection or X-zone 8. Each tail extends first rearward in a parallel manner for a predetermined distance, then the arc of each tail extends inward crossing one another at the X-zone 8. Finally, each tail extends outward and forward, or away from one another from a rear body centerline 16, in this embodiment. The rear body centerline 16 is a line that extends from a rear center point of the body through the center of the X-zone 8 and defines the point where the arc of each sickle shaped tail no longer extends rearward and inward but begins to extend outward or away from the other appendage.

Figure 6:
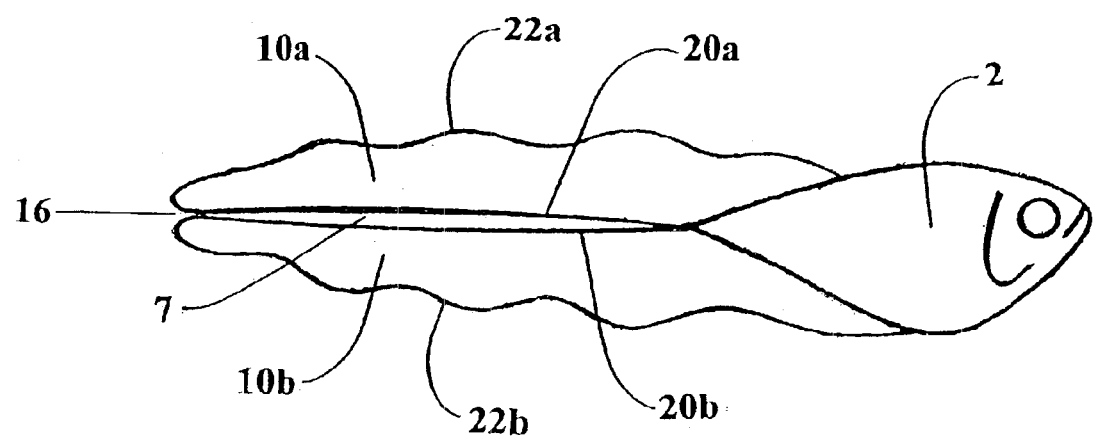
FIG. 6 is a side view of the embodiment of FIG. 1 in motion through the water.

FIG. 6 is a side view of what the present embodiment might look like when towed through the water. FIG. 6 is also an attempt to show the semi-parallel relationship between the upper tail 10*a* and the lower tail 10*b* when in motion. The gap 7 represents a separation between the two tails that can be seen from the side. This gap 7 can be varied by changing the thickness of the tails or by changing the alignment of the tails. The alignment, in the first embodiment, can be changed by building a mold with the inside edge of each tail turned inward or turned outward instead of both tails running parallel for a predetermined distance (see FIG. 12*a*). There is not a lot of room for alignment in the present invention, since too much in either direction produces inferior results, in other words, a wide gap 7, or less width and more of a tendency to tangle. The preferred alignment produces a lure with the smallest possible gap 7 between the two tails, and the widest distance possible between the upper tail outer edge 22*a* and the lower tail outer edge 22*b*, when in motion. The gap 7 shown in FIG. 6 can be reduced to almost nothing with the upper tail inner edge 20*a* and the lower tail inner edge 20*b* becoming almost straight lines, by thinning the tails down to a membrane like thickness.

Figure 7:
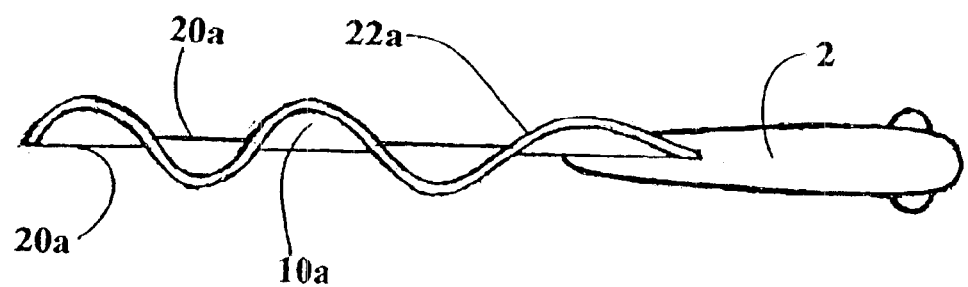
FIG. 7 is a top view of the embodiment of FIG. 1 showing upper tail in motion.

FIG. 7 is an upper-half top view of this embodiment as the lure might look in motion. The upper tail inner edge 20*a* remains in almost a straight line while the upper tail outer edge 22*a* shows a wavy undulating motion.

Figure 8A:
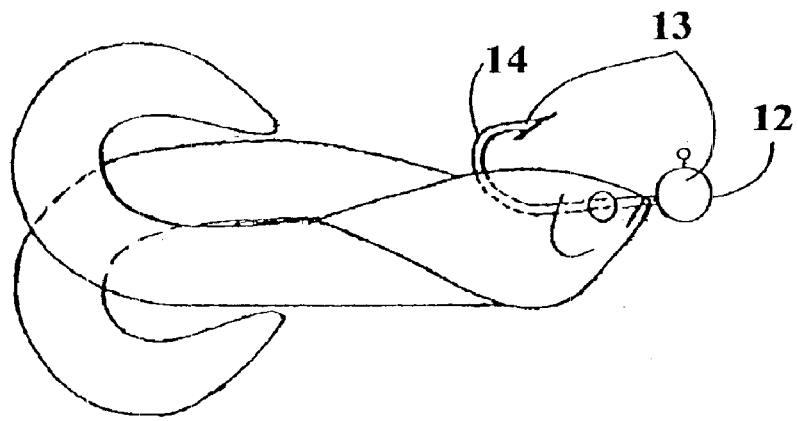
FIG. 8a depicts a side view of the embodiment of FIG. 1 showing jig attachment method.
Figure 8B:
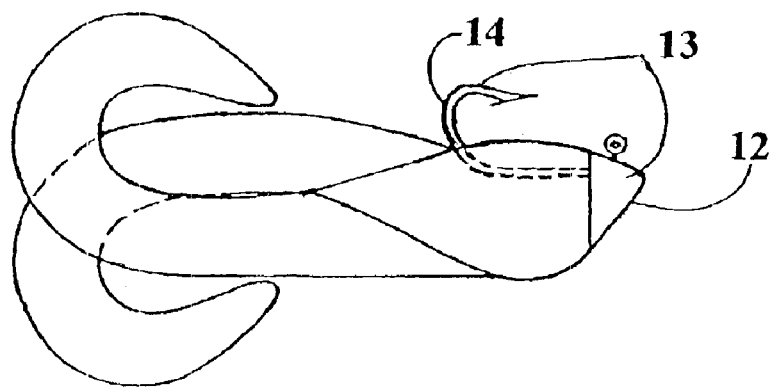
FIG. 8b depicts a side view of the embodiment of FIG. 1 showing jig attachment method.
Figure 8C:
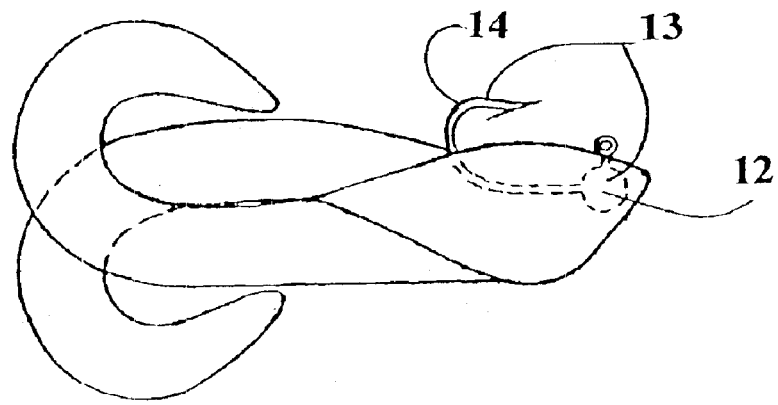
FIG. 8c depicts a side view of the embodiment of FIG. 1 showing jig attachment method.

FIG. 8*a* represents the simplest way of positioning a hook on the lure. The lure body 2 is simply threaded onto a lead head jig 13. A lead head jig 13 is the combination of a lead weight 12 integrally molded to a jig hook 14. Lead head jigs 13 come in many shapes and sizes and could be made in the shape of the tip of the lure body 2 as shown in FIG. 8*b*. FIG. 8*c* represents a lure with a lead head jig 13 integrally molded into the lure body 2 or with a cavity formed into the body to hide the lead head jig 13 within the body 2.

Figure 9A:
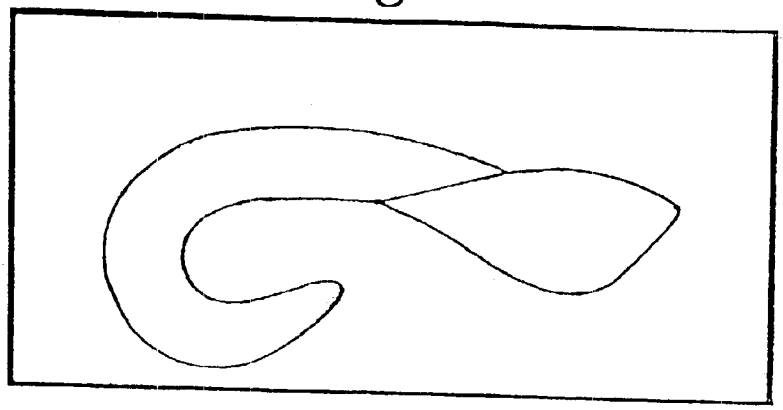
FIG. 9a is a side view of the embodiment of FIG. 1 depicting one half of the mold used to build lure.
Figure 9B:
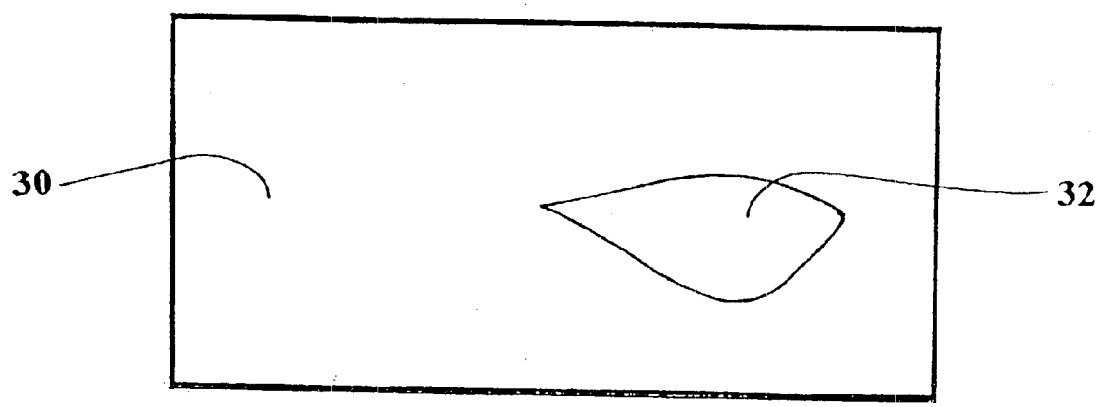
FIG. 9b depicts a separation plate with a cutout in the outline of the lure body.
Figure 9C:
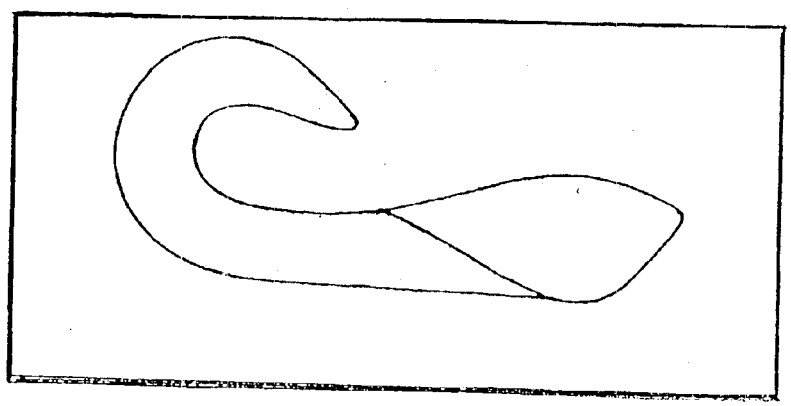
FIG. 9c is a side view of the embodiment of FIG. 1 depicting other half of mold used to build the lure.

FIGS. 9*a*–9*c* depict the mold that is necessary to build the present invention. FIG. 9*a* represents one half of the mold used and depicts the mold cavity for the upper tail and half of the lure body. FIG. 9*b* represents the separation plate 30 with a cutout 32 in the outline of the lure body. The cutout 32 allows the lure body to be molded in one solid piece while the solid plate separates both tails. FIG. 9*c* represents the second half of the mold with a cavity for the lower tail and the second half of the lure body. The separation plate 30 is preferably, removable to make removal of the lures from the mold easier. However, it may be possible to attach the separation plate 30 to one half of the mold with screws or bolts if a lubricant is used to help make removal of the lure from the mold easier on most of the designs shown. By attaching the separation plate 30 to one half of the mold, one less step in the manufacturing process would be required and might be desirable.

Figure 10A:
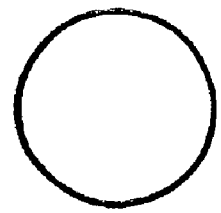
FIG. 10a is a cross-sectional view of lure body showing circular design.
Figure 10B:
FIG. 10b is a cross-sectional view of the lure body showing oval design.
Figure 10C:
FIG. 10c is a cross-sectional view of the lure body showing semi-rectangular design.
Figure 10D:
FIG. 10d is a cross-sectional view of the lure body showing semi-triangular design.

FIGS. 10*a*–10*d* show cross-sectional views of the lure body 2, which might be used with any of the embodiments in this specification. Variations of the views shown could also be used. FIG. 10*a* shows a cross-sectional view of a lure body 2 with a circular design. FIG. 10*b* shows a cross-sectional view of the lure body 2 with an oval design. FIG. 10*c* shows a cross-sectional view of the lure body 2 with a semi-rectangular design. FIG. 10*d* shows a cross-sectional view of the lure body 2 with a semi-triangular design. The semi-triangular design can also be inverted with the point of the triangle up, if desired.

Figure 11A:
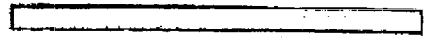
FIG. 11a is a cross-section view of a tail with flat sides and square edges.
Figure 11B:
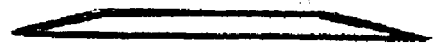
FIG. 11b is a cross-section view of a tail with one flat side and edges tapered on one side.
Figure 11C:
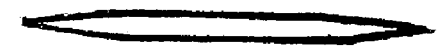
FIG. 11c is a cross-section view of a tail with edges tapered on both sides.
Figure 11D:
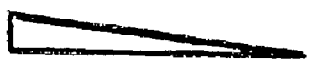
FIG. 11d is a cross-section view of a tail with one or both sides tapered in one direction forming a sharp edge.

The shape of the tails in cross-section can also be varied as shown in drawings 11–11*d*. FIG. 11*a* depicts a flat tail with square edges in cross-section. FIG. 11*b* depicts a tail with one flat side and tapered edges on one side. FIG. 11c depicts a tail with edges tapered on both sides. FIG. 11d depicts a tail with one or both sides tapered in one direction to form a sharp edge.

Figure 12A:
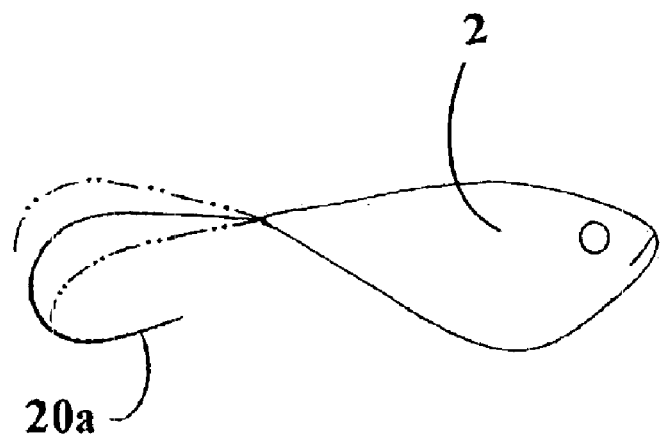
FIG. 12a is a side view of lure showing tail alignment adjustment.

FIG. 12a is an attempt at explaining the tail alignment adjustments that can be made with lures similar to the designs of FIGS. 1 through 7, FIG. 13 and FIG. 25. These designs have tails that extend rearward in a straight line for a predetermined distance before curving in a semi-circular or sickle shape (arc-like). The drawing shows the body 2, the upper tail inner edge 20a and an upper and lower phantom line. In this drawing only one upper tail inner edge 20a is depicted for simplicity, since generally the lower tail is aligned in the same manner as the upper tail. The alignment of the inner edge of each tail is much more critical than the outer edge alignment. The preferred tail alignment for the lures of FIGS. 1–7 and FIG. 13 is depicted by the straight portion of the upper tail inner edge 20a being in alignment with the rear body center line 16. The lower phantom line in the drawing depicts the upper tail inner edge in an alternate alignment position. This position shows the straight portion of the tail inner edge being turned inwards slightly. This alignment may be necessary to get similar results to the preferred alignment, if the tails are made of a different thickness or if the material used to make the lure is of a different hardness than what is preferred. Some experimentation will be necessary to get the desired tail alignment. The upper phantom line in the drawing depicts another alternate alignment position of the upper or the right tail inner edge. This phantom line shows the straight portion of the tail inner edge turned outwards. This alignment might be necessary to produce a lure with two tails that overlap one another in a fish like design or with something like the frog design of FIG. 25.

Figure 12B:
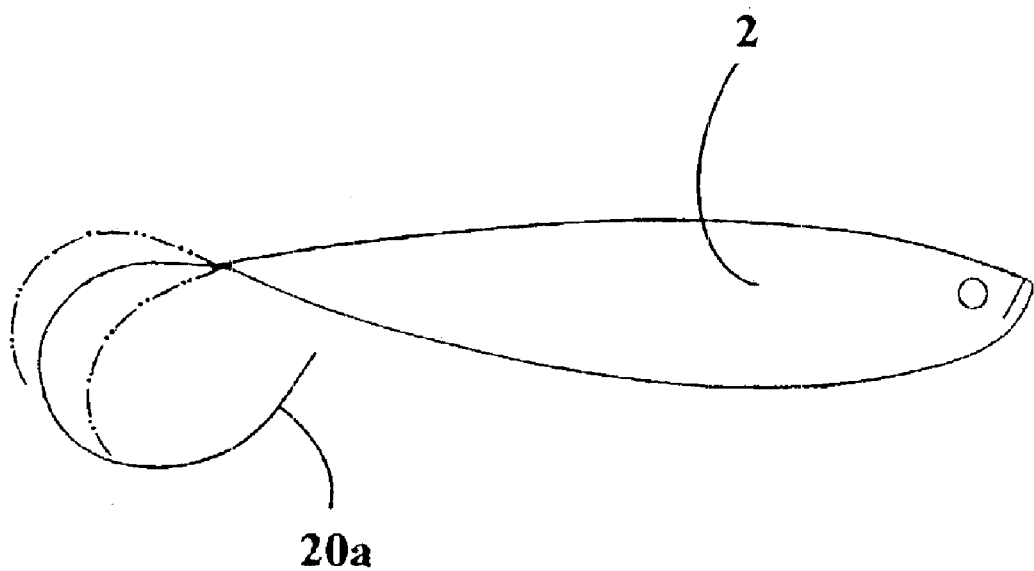
FIG. 12b is a side view of lure showing tail alignment adjustment.

FIG. 12b is an explanation of the alignment adjustments that might be made with most of the other embodiments of the present invention which use tails whose inner edges extend in a semi-circular or sickle shape along their entire length. This drawing shows the body 2, the upper tail inner edge 20a in the preferred alignment and an upper and a lower phantom line depicting alternate tail alignment positions. In the preferred alignment the upper tail inner edge 20a should theoretically extend in an exact rearward direction at the point of attachment with the body only. After the attachment point the upper tail inner edge 20a should extend in a semi-circular arc-like pattern. The lower tail inner edge in the preferred alignment and in all alignments shown here should generally be aligned the same as the upper tail inner edge 20a, but extend in the opposite direction. The lower phantom line in this drawing depicts an upper tail inner edge in an alternate alignment position. The lower phantom line shows an upper tail inner edge that is the same inside diameter as in the preferred alignment, that has been turned inward or pivoted at the point of attachment with the body and turned inward. This alignment might be necessary for tails that are of a different thickness or made with material of a different hardness than that which is preferred. Experimentation will be necessary to achieve the best possible alignment. The upper phantom line in the drawing depicts another alternate alignment position for the upper tail inner edge. The upper phantom line shows an upper tail inner edge that is the same inside diameter as in the preferred alignment, but has been turned or pivoted outwards at the point of attachment with the body 2. This alignment might be necessary to produce two tails that overlap one another such as in the lure designs of FIGS. 15 and 16. There is room for variation in the alignments given here. The preferred alignment should be defined as the desired alignment and the desired alignment can be affected by several different variables, such as, the thickness of the tails used and the hardness of the flexible material used to build the lures.

Figure 13:
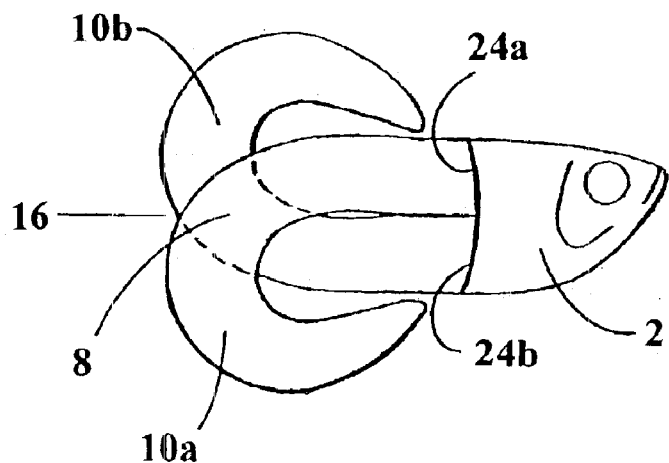
FIG. 13 is a side view of another embodiment.

FIG. 13 depicts another embodiment of the present invention with the upper tail attached edge 24a and lower tail attached edge 24b attached at a rear edge, face or surface of the lure body 2. In this embodiment the tails also first run parallel for a predetermined distance then the arc of each tail turns inward and crosses the other and then extends away from the other.

Figure 14:
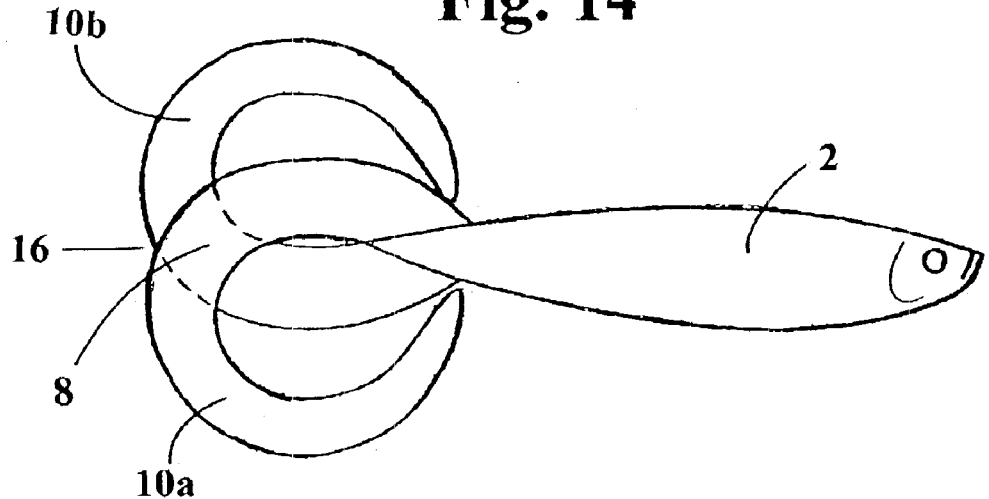
FIG. 14 is a side view of another embodiment.

FIG. 14 depicts another embodiment of the present invention. In this embodiment and in the rest of the embodiments of the present invention, the tails are different in that they no longer parallel one another for a predetermined distance before encountering the semi-circular portion of the tail. Each tail in this embodiment extends first rearward and slightly outwards then the arc extends inward crossing the other tail at the X-zone, then outwards and forward or away from the other tail as shown in the drawing. This embodiment can be improved by immediately turning the arc of each tail inward instead of slightly outward, producing less gap 7.

Figure 15:
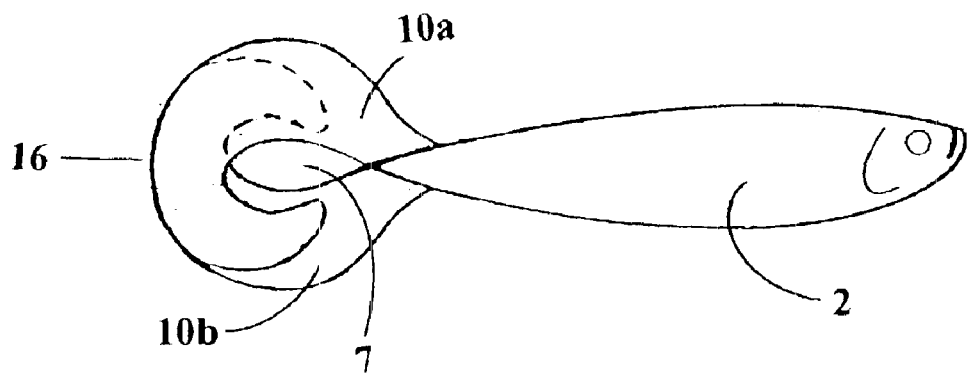
FIG. 15 is a side view of another embodiment.

FIG. 15 depicts another embodiment of the present invention. The upper tail 10a and the lower tail 10b are of the same opposite size and shape and overlap one another so as to look more lie the tail of a fish. Each tail extends first rearward and slightly outward then the arc of each tail turns inward and overlaps the other, then the arc of each tail extends outward and forward or away from the other. The tails of this lure produce a fast vibrating motion when pulled through the water especially with a thicker tail and an excellent rippling motion with a thinner tail.

Figure 16:
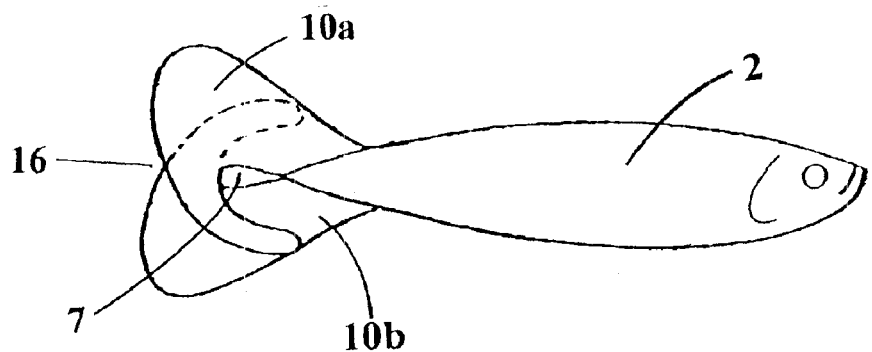
FIG. 16 is a side view of another embodiment.

FIG. 16 depicts another embodiment of the present invention. This embodiment is very similar in design and motion to FIG. 15 except that the tails are more realistic in shape, in that, especially when at rest, they take on the shape of the tail of a fish when they overlap one another. The gap 7 is variable. This design also produces a strong tail vibration with a thicker tail. If the thickness of the tail is too great, the tails won't produce any motion as with the other embodiments of this specification.

Figure 17:
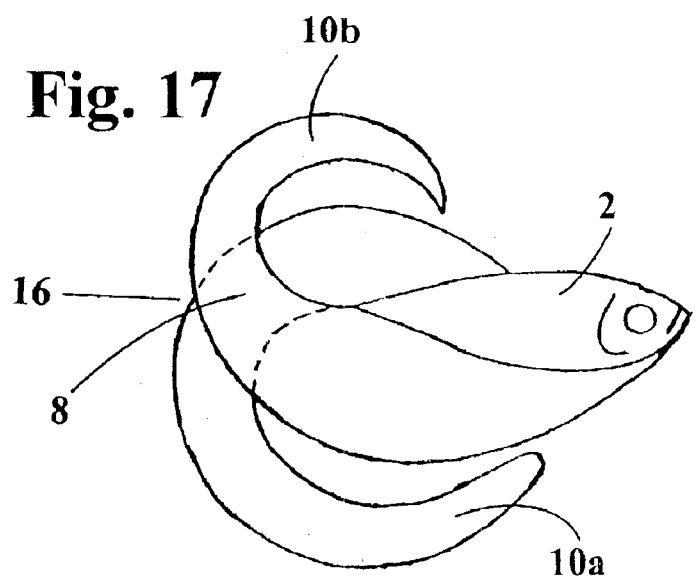
FIG. 17 is a side view of another embodiment.

FIG. 17 depicts another embodiment of the present invention with tails of different lengths, widths and shape with the lower tail 10b extending to the front tip of the lure body 2. The lower tail 10b of this embodiment extends first rearward with the arc extending inward crossing the upper tail 10a at the X-zone then the arc extends outward and forward or away from the other. The upper tail 10a also extends first rearward with the arc extending inward crossing the lower tail 10b at the X-zone then the arc extends outward and forward or away from the other.

Figure 18:
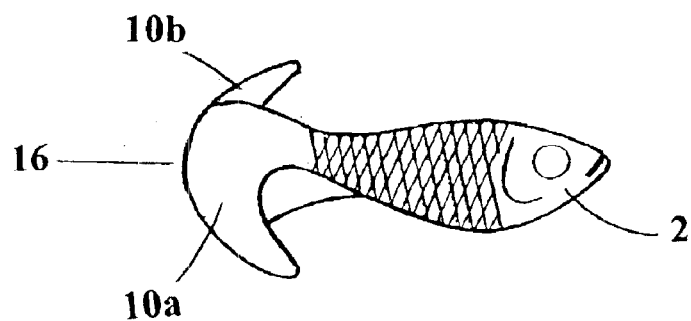
FIG. 18 is a side view of another embodiment.

FIG. 18 depicts another embodiment of the present invention with shorter tails that extend first rearward and inward, cross one another, then extend outwards and slightly forward. This design can produce a strong tail vibration with slightly thicker tails.

Figure 19:
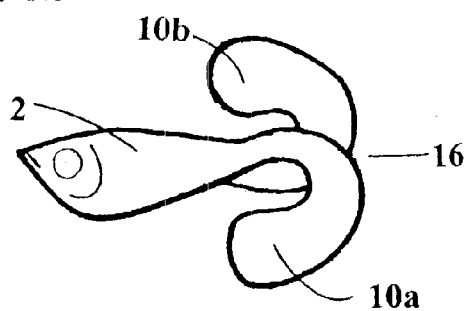
FIG. 19 is a side view of another embodiment with tails that have been reverse engineered.

FIG. 19 is another embodiment of the present invention with tails that have been reverse engineered to produce tails that are narrowest at their attached edges and taper to their widest width near their distal ends. This tail design more closely resembles the tail fin of a fish when extended or in motion, since the tail fin of a fish is wider at its distal end than at the point where it attaches to the body. This design can also produce a strong vibration. Reverse engineered sickle shaped tails, were not found in any prior art lure.

Figure 20:
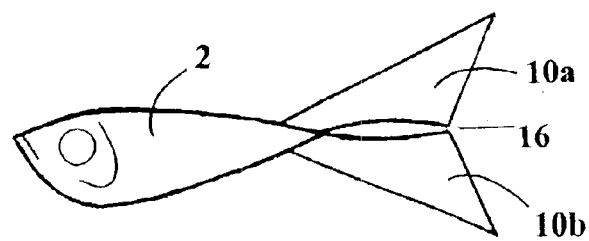
FIG. 20 is a side view of a reversed tail design with tails extended.

FIG. 20 depicts a lure similar to FIG. 19 with tails out stretched as they might appear in motion. The ends of the tail in this version have been squared off at an angle to look even more like the tail of a fish.

Figure 21:
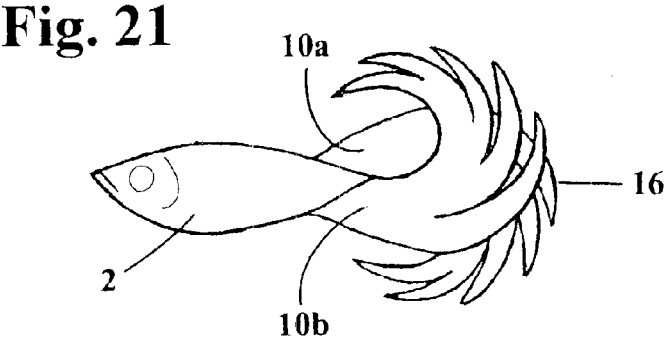
FIG. 21 is a side view of another embodiment that uses improved sickle shaped tails.
Figure 22:
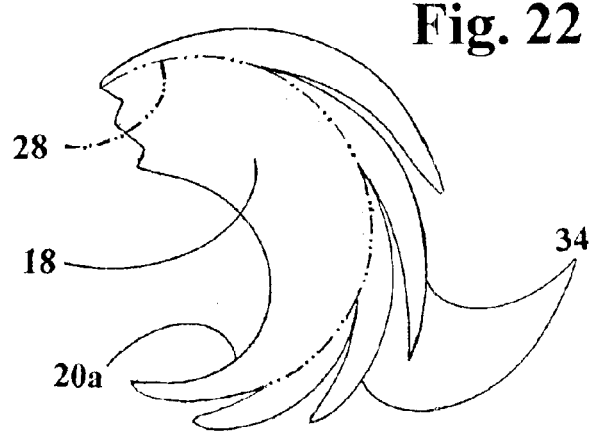
FIG. 22 is a side view of the improved sickle shaped tail.

FIG. 21 and FIG. 22 depict another embodiment of the present invention with improved sickle shaped tails. These improved sickle shaped tails have additional appendages 34 or saw-tooth-like appendages integrally attached and aligned at different points along the outer edge or along an imaginary or phantom outer edge 28 of a regular sickle shaped tail. The additional appendages 34 have a wide sweeping motion along the entire length of the tail and not just near the end of the tail as in some prior art. In motion through the water the outer edge (phantom outer edge 28) buckles and forms waves that undulate along the length of the tail causing the additional appendages 34, attached to this outer edge (phantom outer edge 28) to sweep from side to side. The saw-teeth or additional appendages 34 add motion and visibility to the lure producing very realistic lifelike action. The alignment of the additional appendages 34 shown in FIGS. 21 and 22 is an improvement over the prior art. Prior art lures with appendages near the tip of the tail, actually reduced the action of the tail by shortening the length and reducing the width of the original or innermost sickle shaped appendage 18 or tail. The number, size, length and spacing of the appendages used in this embodiment is completely variable. The only conceivable way of producing a lure like the lure of this embodiment is with tails that are molded in separate parallel planes, it would be impossible to get similar results with tails molded in the same plane.

Figure 23:
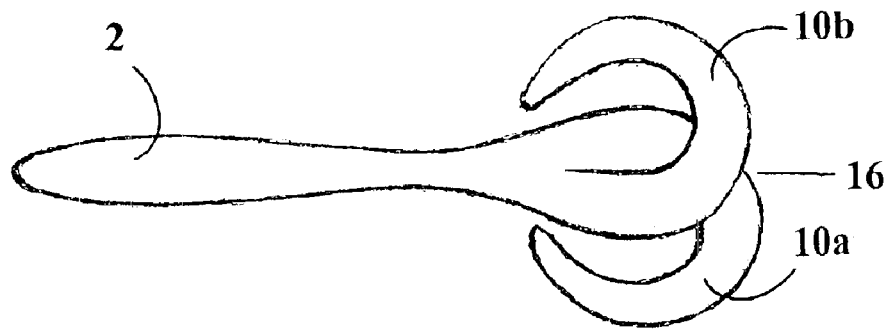
FIG. 23 depicts another embodiment of the present invention resembling a worm or grub.

FIG. 23 is another embodiment of the present invention with a worm or grub like body instead of a fish like body. In this embodiment 10a represents an upper or right tail and 10b represents a lower or left tail, since either would work.

Figure 24:
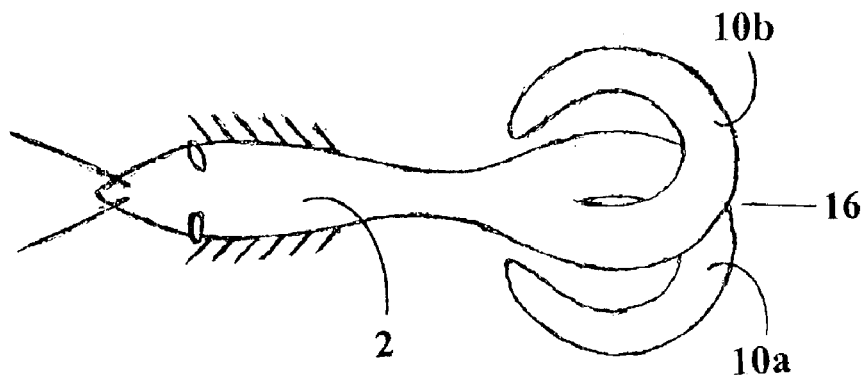
FIG. 24 depicts another embodiment of the present invention resembling a shrimp or crayfish.

FIG. 24 is another embodiment of the present invention with a shrimp or crayfish-like body instead of a fish-like body. In this embodiment 10a represents the right tail and 10b represents the left tail instead of an upper and lower tail respectively as shown in other embodiments.

Figure 25:
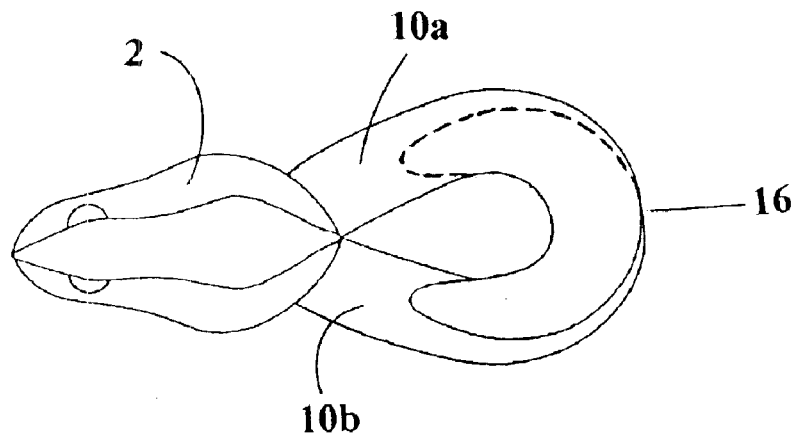
FIG. 25 depicts another embodiment of the present invention resembling a frog.

FIG. 25 is another embodiment of the present invention with a frog like body with tails that overlap one another. 10a represents the right tail and 10b represents the left tail. In this design the tails will be separated from one another when in motion since they first extend outwards. This is the preferred alignment since the tails represent the legs of a frog and not the tails of a fish. The tails could also be formed to look more like the feet and legs of a frog.

Figure 26A:
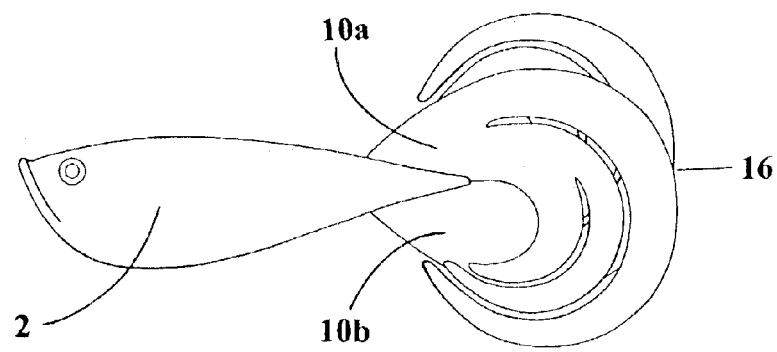
FIG. 26a is a side view of another embodiment with improved sickle shaped tails.
Figure 26B:
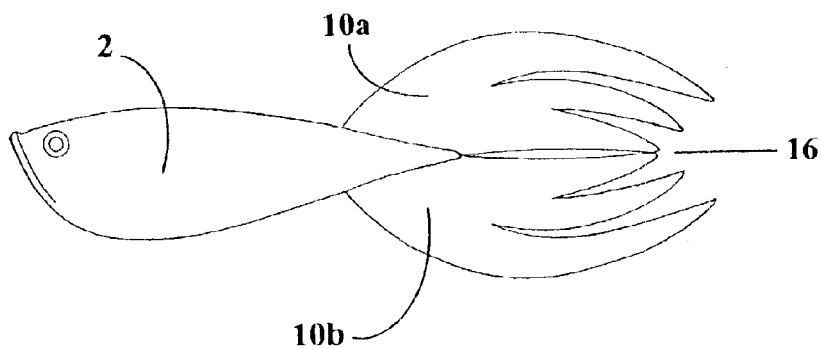
FIG. 26b is a side view of embodiment of FIG. 26a with tails extended as they might look in motion.
Figure 26C:
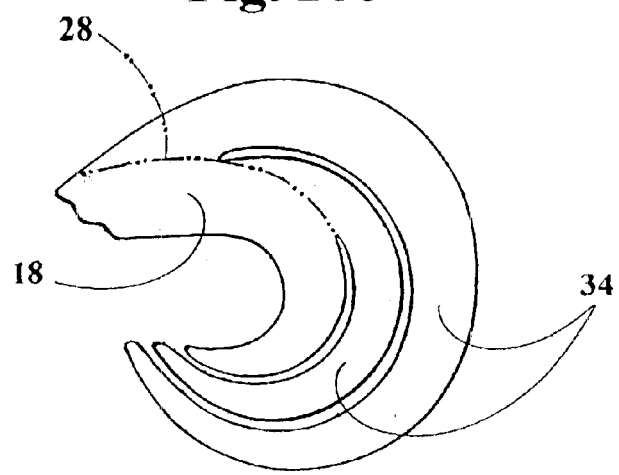
FIG. 26c is a side view of an another improved sickle shaped tail.

FIGS. 26a–26c depict another tail design that is different and might be considered a slight improvement over the tail design of FIGS. 21–22. The tail design of this embodiment is similar to FIGS. 21–22 in that additional appendages 34 are aligned and integrally attached along the outer edge or phantom outer edge 28 of a regular sickle shaped tail or appendage. This produces a wide sweeping motion along the outer edge or phantom outer edge 28 of this innermost sickle shaped appendage 18 and at the attached edges of the additional appendages 34. At the same time, each appendage is also sickle shaped and longer and wider than the saw-tooth design above. This means that each appendage straightens out when in motion and produces undulating motion along its outer edge. At the same time the attached edges of the additional appendages 34 are being moved from side to side in a wide oscillating or sweeping motion because they are attached to the outer edge or phantom outer edge 28 of the innermost sickle shaped appendage 18. The advantages of this design are increased rippling motion over a single sickle tail, with appendages that don't tangle. This tail design is suitable for use as a single tail or for use in any of the X-tail designs in this specification. The tail has more total width at the tip since three tails come together at the tip, producing a more lifelike tail. This is more noticeable when the tails are outstretched in an X-tail design as shown in FIG. 26b. The number of appendages in this design is not limited to two. More appendages will still work as long as they are each attached at different points along the phantom outer edge 28 of the innermost sickle shaped appendage 18, and are long enough and wide enough to produce noticeable undulating motion along their outer edges. The additional appendages 34 of FIGS. 21–22 are shorter and narrower than the additional appendages 34 of this design and don't produce any noticeable undulating motion of their own. This is due to the fact that the inside diameter and outside diameter of these short and narrow appendages are very similar in length. Smaller additional appendages could be added to this design if desired to make it a combination tail containing smaller additional appendages of FIGS. 21–22 and larger additional appendages of this design.

Figure 27A:
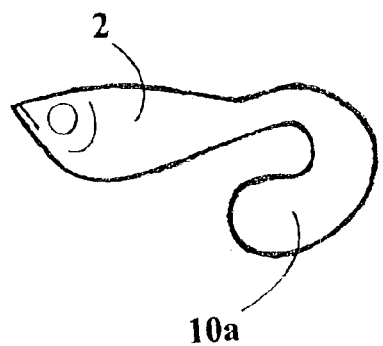
FIG. 27a is a side view of an embodiment similar to FIG. 19, only uses one tail.
Figure 27B:
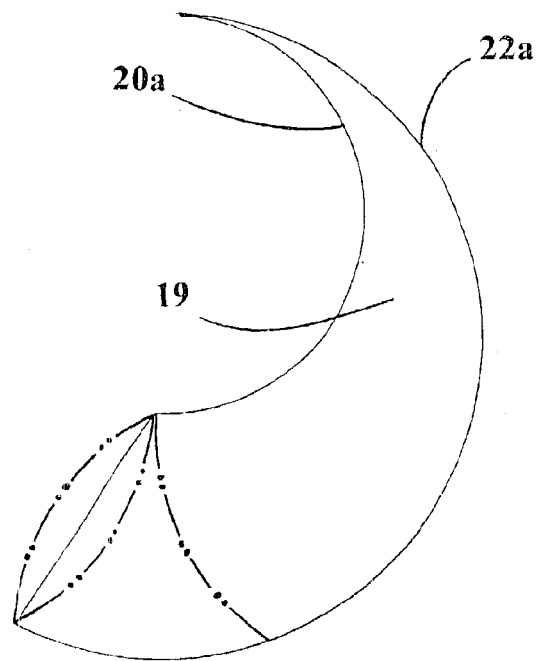
FIG. 27b is a side view of a reverse engineered tail showing different shaped distal ends.

FIG. 27a represents a lure that uses the tail design of FIG. 19, but only uses one tail. This tail design was not seen in any prior art lure. This tail design is a reverse sickle shaped tail or appendage that is narrower at its attached edge and tapers to its widest width near its distal end. This design works well and is closer to the tail of an actual fish, especially in motion, since the tail of a fish is wider at its distal end. The tail design in FIG. 27a is rounded off at its distal end. FIG. 27b depicts several different designs of the reverse sickle shape tail. No prior art was found similar to any of these designs. These tail designs will work with many of the embodiments described in this specification or in a single tail version of many of the embodiments mentioned in this specification. FIG. 27b is a reverse sickle shaped tail with a straight, but angled end. The phantom lines shown in the drawing depict alternate tail designs. From left to right the first phantom line represents a tail with a rounded and angled end. The second phantom line represents a tail cut in a concave, angled pattern. The third phantom line represents a tail with rounded end angled in the opposite direction of the first phantom line.

Figure 27C:
FIG. 27c is a side view of another embodiment which uses a single saw tooth tail.

FIG. 27c depicts a worm or grub like lure that uses only one tail with the same saw-tooth or similar additional appendages 34 as the lure depicted in FIG. 21. A similar single tail could also be used with any of the lure body designs shown in any of the previous embodiments shown in this specification. This tail design has added width with increased visibility and a wide sweeping action.

In all of the preceding embodiments of the present invention many minor changes can be made within the scope of the present invention. Both tails can be of the same exact size or of different lengths, widths and thickness depending on the lure desired. The size of the tails in proportion to the body is also completely variable. The tails can extend the full length of the body if desired. These changes could also include size, coloration, shape of lure body, shape of tails to some extent, the addition of scales, gills, eyes, mouth and other minor body fins or patterning the lure after a certain species of fish. The tail designs in this specification could be used with a body in the basic configuration of a fish, worm, crayfish, shrimp, salamander, waterdog, tadpole or even a frog or some other creature of prey that might swim through the water.

OPERATION OF THE PREFERRED EMBODIMENTS

All of the embodiments of the present invention are designed to be used with a fishing rod, line and hook in a cast and retrieve method of fishing or by trolling.

In all of the embodiments of the present invention, the upper tail 10s, and the lower tail 10b, have a tendency to straighten out by the force of the flow of water across each tail as the lure is being retrieved through the water. This is shown in drawing FIGS. 6 and 7. When this happens, the upper outer edge 22a and the lower outer edge 22b buckle and form waves or ripples which are in constant motion as the lure is towed through the water as shown in FIGS. 6 and 7. This happens because the upper outer edge 22a and the lower outer edge 22b are longer than the upper inner edge 20a and the lower inner edge 20b. The upper inner edge 20a and the lower inner edge 20b straighten out to almost a straight line and seem to almost parallel one another inside edge to inside edge. This relationship when done properly produces a fishing lure with twice as much width of motion as a single sickle tail and up to twice the width of motion as the closest prior art. It also produces a different motion than any prior art lure since the outer edge of each sickle tail has complete freedom of motion. The closest prior art lure might have a tendency to restrict this motion since the tails of the closest prior art are aligned side by side.

FIGS. 19 and 20 depict reverse engineered tail designs that work similarly to the regular sickle shaped tail designs shown in this specification. The main difference is that these tails are wider near their distal ends which makes them resemble more closely the tail of a fish when in motion through the water. Drawing FIG. 20 shows a lure similar to FIG. 19 with reverse tails as they might appear when extended with the tails cut on an angle near their distal ends. Cutting the tails on an angle like this, produces tails with a semi-v at the distal ends when the tails are outstretched and aligned, which looks similar to the tail of a fish. These tail designs could be used with just about any of the body designs in this specification and even in a single tail version.

FIGS. 21 and 22 show a fishing lure with improved sickle shaped tails with saw-tooth-like additional appendages 34 aligned and integrally attached along the outer edges or phantom outer edges 28 of regular sickle shaped tails. The outer edges or phantom outer edges 28 of these sickle tails also buckle when towed through the water producing a rippling motion like regular sickle shaped tails. This causes the attached saw-tooth additional appendages 34 to oscillate from side to side adding flash and a wide area of sweeping motion along the full length of the tail. This tail design could be used with most, if not all, of the body designs shown in this specification. The tail design used in FIGS. 21 and 22 could also be used in place of the rubber skirts used on spinner baits and spoons and would be an improvement in the action of such lures.

FIGS. 26a through 26c show a lure with improved sickle shaped tails similar to FIGS. 21 and 22. FIG. 26a shows the lure as it might look in the mold. FIG. 26b shows what the lure might look like with the tails outstretched. FIG. 26c shows the design of one of these improved tails. This improved tail has additional appendages 34 aligned and integrally attached along a phantom outer edge 28 of a regular sickle shaped appendage, in other words, the innermost sickle shaped appendage 18. The additional appendages 34 are basically of a sickle shape and are generally wide enough and long enough to produce undulating motion on their own. When towed through the water on a fishing line, the outer edge of each additional appendage 34 and the phantom outer edge 28 of the innermost sickle shaped appendage 18, buckle and form waves that produce undulating motion. The additional appendages 34 produce an additional side to side oscillating sweeping motion caused by their integral attachment to the phantom outer edge 28 of the innermost sickle shaped appendage 18. The distal ends of the additional appendages 34 can extend beyond the distal end of the innermost sickle shaped appendage 18 as shown in the drawing. This produces tails that when in motion through the water, form a semi-v shape at their distal ends somewhat like the tail of a fish as shown in FIG. 26b. This tail design or one similar could be used with most, if not all, of the body designs in this specification or in a single tail version using most or all of the body designs in this specification.

FIGS. 27a and 27b show other reverse engineered sickle shaped tail designs. These reverse sickle shaped tails work by the same principle as a regular sickle shaped tail but are at their widest width near their distal ends instead of being narrowest at the distal end as in a regular sickle tail.

In the embodiments of FIGS. 14, 15, 16, 18 and 19 the tails can produce a strong vibrating swimming motion if the tails are made somewhat thicker than the near membrane thickness generally used with sickle shaped tails. Each tail works opposite the other producing a strong vibration. When the tails are thinner they produce a softer rippling motion similar to the other embodiments of the present invention, but still work opposite one another.

All embodiments of the present invention except FIGS. 23, 24, 25 and 27c are designed to be fished with the tails in an upright position so as to mimic the swimming motion of a healthy fish through the water. They could also be used with the tails in a horizontal position if the desire is to imitate an injured or dying fish. FIGS. 24 and 25 should be used with the tails in a horizontal position to imitate the tail of a swimming shrimp or crawfish or the legs of a frog. FIGS. 23 and 27c are preferably used with the well-known Texas Rig, and horizontal and vertical positioning of the tails isn't important since they are designed to resemble worms or grubs with an active swimming tail or tails. A lead head jig 13 or some kind of weighted hook is necessary to be used with most of the embodiments of the present invention so as to achieve proper balance in the water. The design of a lead head jig 13 is such that when attached to the lure as shown in FIGS. 8a–8c gives the lure a low center of gravity and proper balance when towed through the water on a fishing line.

Most of the drawings in this specification depict a fishing lure as molded or in other words as it should look while it is still in the mold. Since the tails are preferably quite flexible and limp, when the lures are removed from the mold, the tails flex due to the force of gravity, and take on whatever shape (arc-like) gravity exerts on them. The basic semi-circular or sickle shaped pattern is still there molded into the tails, but the pattern becomes temporarily distorted due to gravity. This doesn't seem to have any effect on the lure as far as its performance in water, unless the pattern becomes permanently distorted somehow. If the tails do get permanently distorted, if they are made thin enough, they will generally still work properly in the water. This is due to the fact that the inside edge of each tail is shorter than the outside edge and isn't easily changeable.

CONCLUSION, RAMIFICATIONS AND SCOPE OF THE INVENTION

The reader will see that the fishing lures described in all the embodiments shown, describe fishing lures that are different from anything on the market or in any patent found in a patent search, with a wide area of life-like swimming motion. The wide area of motion attracts gamefish from a distance. While the above description contains many specificities, these should not be construed as limitations on the scope of this invention, but rather as exemplifications of the preferred embodiments thereof. Several ramifications of the present invention have been shown in the preceding drawings. The basic semicircular shaped or arc-like tails ca be modified somewhat as shown in the drawings and can be even further modified to some degree as far as shape, size, length, width and thickness. The lure body and tails can also be made to closely resemble the body and fins of a fish with the impressions of scales, mouth, eyes, gills, fin striations and minor body fins molded to the body or painted onto the body. Body coloration can be varied, a scent added and commercially available rattles could be added to the lure for added attraction. A lead head jig can be used with the lure in several ways as shown in the drawings. Other hooking methods could be used, such as commercially available weighted hooks.

SUMMARY OF THE INVENTION

The fishing lure of the present invention comprises a body made completely of flexible, material integrally molded to two thin flexible sickle shaped, semi-circular or similar arc-like tails. The lure is preferably injection molded, using a soft flexible plastic such as vinyl plastisol or something similar. The tails of the fishing lure are basically flat and lie on separate horizontal planes. The tails of the lure are attached to an upper and lower edge, face or surface of the lure body. The tails of the lure are generally positioned inside circumference to inside circumference, or inside edge to inside edge opposite one another. Each tail generally extends first rearward and at a predetermined point in its length the arc extends inward and crosses the other tail, or overlaps the other. After crossing or overlapping the other tail the arc of each tail extends outward and forward or away from the other tail. The tails must be separated from each other during the molding process and in use, which is achieved by using a plate between the two halves of the mold used to build the lure. The tails can be of the same size or of differing lengths, widths or thickness as desired and can be positioned so as to overlap one another to form the general shape of a fishes tail fin. By positioning the tails inside edge to inside edge a wide area of motion can be achieved resembling more closely the undulating rippling motion of the body and fins of a fish. The lure can be used in an upright manner and it is recommended that a lead head jig or weighted hook be used to give the lure proper balance when towed through the water on a fishing line. The present invention also discloses several new tail designs that could be used in a single tail or double tail version.

What is claimed is:
1. An artificial lure comprising:
(a) an integral body and tail portion;
(b) said body configuration selected from the group consisting of fish, worms, crayfish, shrimp, frogs or other creatures of prey, said body portion of sufficient dimensions to provide means for hooking a fish;
(c) said tail portion comprising an upper or lower or a right and left sickle shaped appendage, said sickle shaped appendages molded in separate parallel planes with a parallel space therebetween, said sickle shaped appendages arranged substantially opposite one another when molded, the full width of each said sickle shaped appendage when molded extends in a general rearward direction with the arc of each said sickle shaped appendage for part of its length directed in an inward direction, the said full width of each said sickle shaped appendage somewhere along its said length crosses the other said sickle shaped appendage in an opposite manner in the mold, after said sickle shaped appendages cross one another in said mold, said arc of each said sickle shaped appendage continues to its distal end; said sickle shaped appendages precisely aligned in said mold, whereby producing a predetermined gap between the inside edges of said sickle shaped appendages when the lure is pulled through the water on a fishing line;
(d) said upper or right sickle shaped appendage integrally attached to an upper or right surface respectively of said body portion;
(e) said lower or left sickle shaped appendage integrally attached to a lower or left surface respectively of said body portion.

2. The lure of claim 1 wherein the inside edge arc of each said sickle shaped appendage is immediately directed inward at the point of attachment to said body portion, said sickle shaped appendages precisely aligned in the mold, thickness of said sickle shaped appendages and hardness of flexible material used to make said sickle shaped appendages precisely determined whereby the inside arc of each said sickle shaped appendage straightens out and aligns inside edge to inside edge in a preferably parallel manner with minimal gap between the inside edges when pulled through the water on a fishing line and viewed from the side.

3. An artificial lure comprising:
(a) an integral body and tail portion;
(b) said body configuration selected from the group consisting of fish, worms, crayfish, shrimp, frogs or other creatures of prey, said body portion of sufficient dimensions to provide means for hooking a fish;
(c) said tail portion comprising an upper or lower or a right and left modified sickle shaped appendage, the inside edge of each said modified sickle shaped appendage from the area of attachment to the lure body and for a predetermined portion of its length is substantially a straight line, the inward directed arc of each said modified sickle shaped appendage begins at a predetermined point in the length of said modified sickle shaped appendage after the straight portion, said modified sickle shaped appendages molded in separate parallel planes with a parallel space therebetween, said modified sickle shaped appendages arranged substantially opposite one another when molded, the full width of each said modified sickle shaped appendage when molded extends in a general rearward direction with the said arc of each said sickle shaped appendage for part of its length directed in an inward direction, the said full width of each said modified sickle shaped appendage somewhere along its said length crosses the other said modified sickle shaped appendage in an opposite manner in the mold, after said modified sickle shaped appendages cross one another in said mold, said arc of each said modified sickle shaped appendage continues to its distal end; said modified sickle shaped appendages precisely aligned in said mold, whereby producing a predetermined gap between the inside edges of said modified sickle shaped appendages when the lure is pulled through the water on a fishing line;
(d) said upper or right modified sickle shaped appendage integrally attached to an upper or right surface respectively of said body portion;
(e) said lower or left modified sickle shaped appendage integrally attached to a lower or left surface respectively of said body portion.

4. The lure of claim 3 wherein the straight portions of the inside edges of both said modified sickle shaped appendages are aligned in a substantially parallel manner, said modified sickle shaped appendages precisely aligned in the mold, thickness of said modified sickle shaped appendages and hardness of flexible material used to make said modified sickle shaped appendages precisely determined whereby the inside arc of each said modified sickle shaped appendage straightens out and aligns inside edge to inside edge in a preferably parallel manner with minimal gap between the inside edges when pulled through the water on a fishing line and viewed from the side.

5. An artificial lure comprising:

(a) an integral body and tail portion;

(b) said body configuration selected from the group consisting of fish, worms, crayfish, shrimp, frogs or other creatures of prey, said body portion of sufficient dimensions to provide means for hooking a fish;

(c) said tail portion comprising an upper or lower or a right and left improved sickle shaped appendage, said improved sickle shaped appendages comprising a number of additional appendages, said additional appendages integrally attached at different points along a phantom outer edge of innermost sickle shaped appendage of said improved sickle shaped appendage, said additional appendages separated from one another along their entire lengths, said improved sickle shaped appendages molded in separate parallel planes with a parallel space therebetween, said improved sickle shaped appendages arranged substantially opposite one another when molded, the full width of each said improved sickle shaped appendage when molded extends in a general rearward direction with the arc of each said innermost sickle shaped appendage of said improved sickle shaped appendage for part of its length directed in an inward direction, the said full width of each said innermost sickle shaped appendage of said improved sickle shaped appendage somewhere along its said length crosses the other said innermost sickle shaped appendage of said improved sickle shaped appendage in an opposite manner in the mold, after said innermost sickle shaped appendages cross one another in said mold, said arc of each said innermost sickle shaped appendage continues to its distal end; said improved sickle shaped appendages precisely aligned in said mold, whereby producing a predetermined gap between the inside edges of said improved sickle shaped appendages when the lure is pulled through the water on a fishing line;

(d) said upper or right improved sickle shaped appendage integrally attached to an upper or right surface respectively of said body portion;

(e) said lower or left improved sickle shaped appendage integrally attached to a lower or left surface respectively of said body portion.

6. The lure of claim 5 wherein said additional appendages are of a basic sickle shape of sufficient length and width whereby noticeable undulating motion is produced especially along the outer edge of each said additional appendages when pulled through the water on a fishing line.

7. The lure of claim 5 wherein the inside edge arc of each said innermost sickle shaped appendage of said improved sickle shaped appendage is immediately directed inward at the point of attachment to said body portion, said improved sickle shaped appendages precisely aligned in the mold, thickness of said improved sickle shaped appendages and hardness of flexible material used to make said improved sickle shaped appendages precisely determined whereby the inside arc of each said innermost sickle shaped appendage of said improved sickle shaped appendage straightens out and aligns inside edge to inside edge in a preferably parallel manner with minimal gap between the inside edges when pulled through the water on a fishing line and viewed from the side.

8. The lure of claim 7 wherein said additional appendages are of a basic sickle shape of sufficient length and width whereby noticeable undulating motion is produced especially along the outer edge of each said additional appendage when pulled through the water on a fishing line.

9. An artificial lure comprising:

(a) an integral body and tail portion;

(b) said body configuration selected from the group consisting of fish, worms, crayfish, shrimp, frogs or other creatures of prey, said body portion of sufficient dimensions to provide means for hooking a fish;

(c) said tail portion comprising an upper or lower or a right and left reverse sickle shaped appendage, said reverse sickle shaped appendages narrowest width wise at point of attachment to said body portion and taper to their widest width near their distal ends, said reverse sickle shaped appendages molded in separate parallel planes with a parallel space therebetween, said reverse sickle shaped appendages arranged substantially opposite one another when molded, the full width of each said reverse sickle shaped appendage when molded extends in a general rearward direction with the arc of each said reverse sickle shaped appendage for part of its length directed in an inward direction, the said full width of each said reverse sickle shaped appendage somewhere along its said length crosses the other said reverse sickle shaped appendage in an opposite manner in the mold, after said reverse sickle shaped appendages cross one another in said mold, said arc of each said reverse sickle shaped appendage continues to its distal end; said reverse sickle shaped appendages precisely aligned in the mold, whereby producing a predetermined gap between the inside edges of said reverse sickle shaped appendages when the lure is pulled through the water on a fishing line;

(d) said upper or right reverse sickle shaped appendage integrally attached to an upper or right surface respectively of said body portion;

(e) said lower or left reverse sickle shaped appendage integrally attached to a lower or left surface respectively of said body portion.

10. The lure of claim 9 wherein the inside edge arc of each said reverse sickle shaped appendage is immediately directed inward at the point of attachment to said body portion, said reverse sickle shaped appendages precisely aligned in the mold, thickness of said reverse sickle shaped appendages and hardness of flexible material used to make said reverse sickle shaped appendages precisely determined whereby the inside arc of each said reverse sickle shaped appendage straightens out and aligns inside edge to inside edge in a preferably parallel manner with minimal gap between the inside edges when pulled through the water on a fishing line and viewed from the side.

11. An artificial lure comprising:

(a) an integral body and tail portion;

(b) said body configuration selected from the group consisting of fish, worms, crayfish, shrimp, frogs or other creatures of prey, said body portion of sufficient dimensions to provide means for hooking a fish;

(c) said tail portion comprising an upper or lower or a right and left overlapping sickle shaped appendage, each said overlapping sickle shaped appendage of the same size and shape and overlaps and covers the other said overlapping sickle shaped appendagein an opposite manner in the mold, said overlapping sickle shaped appendages molded in separate parallel planes with a parallel space therebetween, said overlapping sickle shaped appendages arranged substantially opposite one another when molded, the full width of each said overlapping sickle shaped appendage when molded extends in a general rearward direction with the arc of each said overlapping sickle shaped appendage for part of its length directed in an inward direction, the said full width of each said overlapping sickle shaped appendage somewhere along its said length crosses the other said overlapping sickle shaped appendage in an opposite manner in the mold, after said overlapping sickle shaped appendages cross one another in said mold, said arc of each said overlapping sickle shaped appendage continues to its distal end; said overlapping sickle shaped appendages precisely aligned in the mold, whereby producing a predetermined gap between the inside edges of said overlapping sickle shaped appendages when the lure is pulled through the water on a fishing line;

(d) said upper or right overlapping sickle shaped appendage integrally attached to an upper or right surface respectively of said body portion;

(e) said lower or left overlapping sickle shaped appendage integrally attached to a lower or left surface respectively of said body portion.

12. The lure of claim 11 wherein the inside edge arc of each said overlapping sickle shaped appendage is immediately directed inward at the point of attachment to said body portion, said overlapping sickle shaped appendages precisely aligned in the mold, thickness of said overlapping sickle shaped appendages and hardness of flexible material used to make said overlapping sickle shaped appendages precisely determined whereby the inside arc of each said overlapping sickle shaped appendage straightens out and aligns inside edge to inside edge in a preferably parallel manner with minimal gap between the inside edges when pulled through the water on a fishing line and viewed from the side.

13. An artificial lure comprising:

(a) an integral body and tail portion;

(b) said body configuration selected from the group consisting of fish, worms, crayfish, shrimp, frogs or other creatures of prey, said body portion of sufficient dimensions to provide means for hooking a fish;

(c) said tail portion comprising an upper or lower or a right and left modified overlapping sickle shaped appendage, said modified overlapping sickle shaped appendage when overlapped in an opposite manner resemble the tail fin of a fish when viewed from the side in the mold, said modified overlapping sickle shaped appendages molded in separate parallel planes with a parallel space therebetween, said modified overlapping sickle shaped appendages arranged substantially opposite one another when molded, the full width of each said modified overlapping sickle shaped appendage when molded extends in a general rearward direction with the arc of each said modified overlapping sickle shaped appendage for part of its length directed in an inward direction, the said full width of each said modified overlapping sickle shaped appendage somewhere along its said length crosses the other said modified overlapping sickle shaped appendage in an opposite manner in the mold, after said modified overlapping sickle shaped appendages cross one another in said mold, said arc of each said modified overlapping sickle shaped appendage continues to its distal end; said modified overlapping sickle shaped appendages precisely aligned in the mold, whereby producing a predetermined gap between the inside edges of said modified overlapping sickle shaped appendages when the lure is pulled through the water on a fishing line;

(d) said upper or right modified overlapping sickle shaped appendage integrally attached to an upper or right surface respectively of said body portion;

(e) said lower or left modified overlapping sickle shaped appendage integrally attached to a lower or left surface respectively of said body portion.

14. The lure of claim 13 wherein the inside edge arc of each said modified overlapping sickle shaped appendage is immediately directed inward at the point of attachment to said body portion, said modified overlapping sickle shaped appendages precisely aligned in the mold, thickness of said modified overlapping sickle shaped appendages and hardness of flexible material used to make said modified overlapping sickle shaped appendages precisely determined whereby the inside arc of each said modified overlapping sickle shaped appendage straightens out and aligns inside edge to inside edge in a preferably parallel manner with minimal gap between the inside edges when pulled through the water on a fishing line and viewed from the side.

* * * * *